3,420,881
RECLAMATION PROCESS
Joseph Francis Turco and Jean A. Marriott, Westerly, R.I., assignors to General Dynamics Corporation, New York, N.Y., a corporation of Delaware
Filed Mar. 3, 1966, Ser. No. 531,475
U.S. Cl. 260—535         8 Claims
Int. Cl. C07c *51/55;* C07c *51/42;* C07c *59/16*

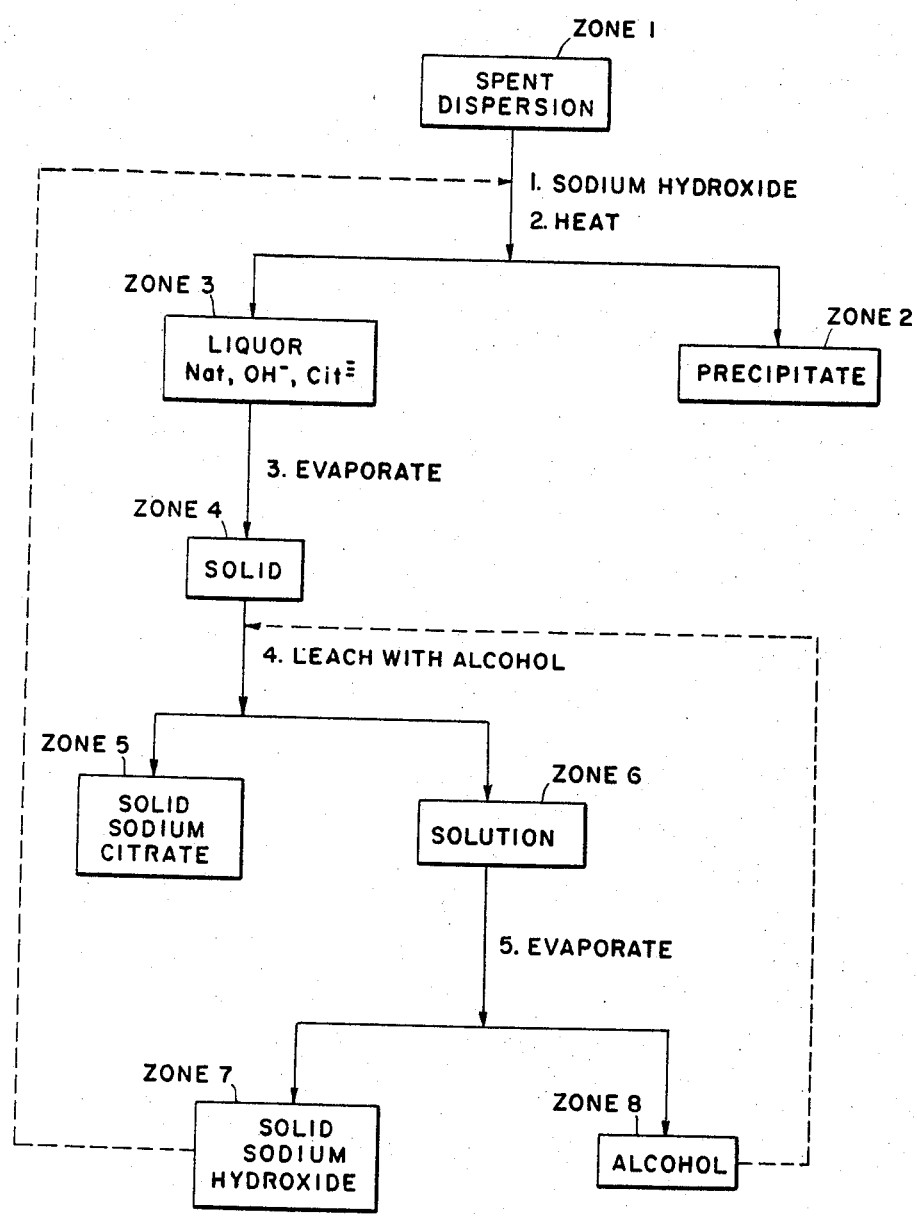

The present invention relates to the production of a solid, substantially pure, alkali metal citrate. More particularly the present invention concerns the regeneration of solid substantially pure alkali metal citrates from dispersions of citric acid and salts of citric acid, which have become "spent" as the result of their use in the removal of metallic materials from various surfaces by a complexing action.

Citric acid and its salts are widely used in the preparation of flavoring extracts; confections; soft drinks; effervescent salts; medicines, antioxidants for foods, alkyd resins and mordants; and particularly in cleaning processes. Citric acid and its salts are particularly effective in cleaning processes because of their ability to readily remove scale, through the formation of metal complexes, from metallic surfaces. Other materials such as dilute sulfuric acid and dilute hydrochloric acid have been used for such scale removal. There are disadvantages, however, in the use of these materials, e.g., the removal of a large quantity of the base metal and the formation of a sludge. Sludge removal, in turn, presents problems especially when cleaning high pressure-boilers and the like.

The effectiveness of citric acid and its salts in cleaning processes has been demonstrated in commonly assigned application Ser. No. 452,055 filed Apr. 30, 1965, by Bernard J. Freedman, Richard A. Georgetti and William R. Tedeschi, where there is described a novel electrolytic process for removing scale from metal surfaces using citric acid and its salts. In commonly assigned application Ser. No. 301,881 filed Aug. 13, 1963, by William R. Tedeschi the usefulness of a citric acid component in chemical cleaning is further illustrated.

In any cleaning or descaling operation with a citric acid component, especially the citric acid component disclosed in Ser. Nos. 452,055 and 301,881 the citric acid component having achieved a desired cleaning or descaling is conventionally in what is called a spent state, its effectiveness being reduced because of the complexing or chelating reaction of the citric acid component with a complexing metal. The term "spent" as used herein encompasses not only a citric acid component which has been rendered totally ineffective for a cleaning or descaling operation but includes also a citric acid component which has been rendered less than optimum in a cleaning or descaling operation.

It is highly desirable to have a cheap source of solid substantially pure alkali metal citrates because of their wide use. In view of the extensive use of citric acid and its salts in cleaning processes, spent citrates provide a source.

In reclaiming solid, substantially pure alkali metal citrates from spent citrates problems have been encountered. Thus treatment of a spent ammonium citrate solution with barium chloride resulted in a solid barium citrate which on acidification with sulfuric acid produced solid barium sulfate and a solution of a highly contaminated citric acid. In another attempt, treatment of an acidified spent citrate solution with potassium ferrocyanide produced substantial quantities of an iron component in the citrate. In yet another attempt, treatment of a spent ammonium citrate solution with benzenephosphinic acid resulted in the precipitation of iron benzenephosphinate which was too soluble for isolation from the citric acid component. Prior act processes that have produced to some extent substantially pure alkali metal citrates from a spent citrate have been costly and have created considerable disposal problems.

An object of the present invention is to provide a novel, simple and inexpensive process for the recovery of a solid, substantially pure alkali metal citrate from a spent citrate dispersion.

Another object of the present invention is to provide an efficient and economic process for reclaiming a solid, substantially pure alkali metal citrate from a spent citrate dispersion obtained in descaling and cleaning operations of metal surfaces with a citric acid component.

A further object of the present invention is to provide an efficient and economic process for reclaiming a solid, substantially pure alkali metal citrate from a spent citrate dispersion obtained as a result of the descaling cleaning operations illustrated in said Ser. Nos. 452,055 and 301,881.

Still another object of the present invention is to eliminate the disposal problem of waste citrate dispersions normally encountered in present descaling processses.

Another object of the present invention is to provide an efficient and economic process for reclaiming alkali metal hydroxides.

Other and additional objects of this invention will be apparent to those skilled in the art from the ensuing description, examples and drawing.

It has surprisingly been found that the foregoing objectives can be achieved by a combination of several specific steps. Broadly stated, the recovery process of the present invention comprises contacting a spent citrate dispersion with a quantity of an alkali metal hydroxide sufficient to raise the pH of the spent dispersions to at least about 10.5 thereby precipitating the metal complexed with the citrate. The precipitated solids are separated from the mother liquor by any suitable means, e.g., by filtration, decantation and the like, washed as desired and the washings combined with the mother liquor.

After separation of the precipitated solids, the mother liquor is evaporated to dryness. The resultant solids are then leached by continuous treatment with an organic solvent capable of dissolving alkali metal hydroxides but not the alkali metal citrate, the leaching continued until an aqueous dispersion of a portion of the solids gives a pH of about 8.5 to 9. Any organic solvent which can dissolve the alkali hydroxide but not the alkali salt can be used. Methyl alcohol is preferred because it dissolves the hydroxides but not the citrate and also because it is readily volatile, and, therefore, can be regenerated without large power requirements, e.g., simply and cheaply by distillation. An economic advantage also accrues from the use of an organic solvent, especially methyl alcohol as compared with other separation techniques, such as ion exchange regeneration techniques, where expensive regeneration processes are necessary for a continuous operation.

The solids remaining from the leaching operation are then dried to yield a substantially pure white granular opaque crystalline alkali metal citrate of high purity, an analysis of trisodium citrate dihydrate obtained by the process assaying at 99.4 percent.

Where needed, it is advantageous in the above process to filter the spent citrate dispersion to remove any suspended solids prior to treatment with the alkali metal hydroxide, the alkali metal hydroxide preferably being of the same cation as that of original alkali metal citrate that may be used in the cleaning or descaling process.

In the above process it has also been found advantageous prior to the separation of the precipitated solids, resulting from the treatment with alkali metal hydroxide, to boil the dispersion to completely drive off any volatile salt forming ingredients as ammonia which may be released in the treatment with the alkali metal hydroxide, e.g., ammonia. Such boiling also coagulates the precipitate and insures complete precipitation of the complexing metals.

The process of the present invention provides not only an efficient and economic way for recovering a solid, substantially pure alkali citrate but also for reclaiming alkali metal hydroxide since alkali metal hydroxide can be readily obtained from the organic solvent used in the leaching step by evaporation. The reclaimed alkali metal hydroxide can then be used in recovering additional alkali metal citrate from spend citrate dispersions.

If desired, the process can be adapted to a continuous operation. Thus referring to the accompanying drawing, a spent sodium citrate dispersion in storage reservoir (Zone 1) is treated with sodium hydroxide and heated. The resulting precipitate is separated (Zone 2) and the mother liquor (Zone 3) containing sodium ions, hydroxide ions and citrate ions evaporated to dryness. The resultant solid (Zone 4) is leached with alcohol leaving solid sodium citrate (Zone 5) and a solution (Zone 6) containing sodium hydroxide dissolved in the alcohol. This solution on distillation yields sodium hydroxide (Zone 7) and the alcohol (Zone 8). The alcohol can be recirculated for the leaching step and the sodium hydroxide reused in the precipitation step.

The following examples are given to aid in understanding the invention but it is to be understood that the invention is not restricted to the specific examples. The examples are illustrative only and should not be construed as limiting the invention which is properly delineated in the appended claims.

EXAMPLE 1

A spent solution resulting from the electrolytic descaling of steel with a sodium citrate solution as described in said Ser. No. 452,055 is cooled to room temperature. The spent solution is treated with sodium hydroxide to a minimum pH of about 10.5. The suspension is thereupon heated to just below its boiling point and allowed to digest for approximately 30 minutes. Thereupon the suspension is suction filtered to yield a clear filtrate with a slight yellow color. The clear filtrate is evaporated to dryness and the resulting solid leached with warm methanol. The leaching is continued until a small amount of the solid dissolved in water gives a pH between 8.5 and 9. Thereupon the solid is dried in an oven at about 150° C. for a period of about 2 hours. There results solid, substantially pure trisodium citrate dihydrate. An additional two hour drying in the oven yields solid, substantially pure trisodium citrate.

EXAMPLE 2

A spent solution resulting from the electrolytic descaling of steel with a potassium citrate solution as described in said Ser. No. 452,055 is cooled to room temperature and treated with potassium hydroxide to precipitate the chelated metal. The resulting suspension has a minimum pH of at least about 10.5. The suspension is then heated to just below its boiling point and allowed to digest for approximately 30 minutes. The suspension is then suction filtered to yield a clear filtrate, with a slight yellow color. The clear filtrate is evaporated to dryness and the resultant solid leached with warm methanol. Leaching is continued until a small amount of the solid dissolved in water gives a pH between 8.5 and 9. The solid is then oven dried at about 150° C. for about two hours to yield a solid, substantially pure tripotassium citrate dihydrate. An additional two hour drying in the oven yields solid, substantially pure tripotassium citrate.

While there have been described herein certain embodiments of the invention, it will be obvious to those skilled in the art that modifications and changes may be made therein without departing from the essence of the invention. It is, therefore, to be understood that the exemplary embodiments and drawings are illustrative and not restrictive of the invention, the scope of which is defined in the following claims, and that all modifications that come within the meaning and range of equivalency of the claims and would be obvious to those skilled in the art, are intended to be included therein.

Also the terms and expressions which have been employed in the specification are used as terms of description and not of limitation, and there is no intention, in the use of such terms and expressions of excluding any equivalents of the features shown and described or portions thereof, since it is recognized that various modifications are possible within the scope of the invention claimed.

Having described the present invention in some detail, that which is sought to be protected is set forth in the following claims:

1. Process for producing a solid, substantially pure alkali metal citrate by reclaiming a spent aqueous citrate dispersion derived from citrate solution that has been used for removal of metallic scale from a surface which comprises contacting the spent aqueous citrate dispersion with an alkali metal hydroxide sufficient to raise the pH of the spent dispersion to at least 10.5, separating the precipitated solids, evaporating the resultant solution to dryness, leaching the resultant solid with an organic solvent that is capable of dissolving the alkali metal hydroxide but not the alkali metal citrate until an aqueous solution of a portion of the solid measures at a pH of between about 8.5 and 9, and thereupon drying the remaining solid.

2. Process for producing a solid, substantially pure alkali metal citrate according to claim 1, wherein the spent aqueous citrate dispersion is derived from an electrolytic descaling of metal with citrate solution.

3. Process according to claim 1, wherein any insoluble suspended material is removed from the spent citrate dispersion prior to treatment with the alkali metal hydroxide.

4. Process according to claim 1 whereby the precipitated solids prior to their separation are coagulated by heat.

5. Process according to claim 1 wherein the alkali metal hydroxide is sodium hydroxide.

6. Process according to claim 1 wherein the alkali metal hydroxide is potassium hydroxide.

7. Process according to claim 1 wherein the organic solvent is methyl alcohol.

8. Process according to claim 7 with the additional steps that the methyl alcohol and alkali metal hydroxide are reclaimed from the solution obtained in the leaching step.

References Cited

UNITED STATES PATENTS

| 3,033,214 | 5/1962 | Bersworth et al. | 260—534 X |
| 3,304,246 | 2/1967 | Fukui et al. | 204—145 |

LORRAINE A. WEINBERGER, *Primary Examiner.*

A. P. HALLUIN, *Assistant Examiner.*

U.S. Cl. X.R.

75—101; 134—13; 204—145; 210—58; 260—527